Jan. 15, 1952     C. M. O'LEARY     2,582,217
HYDRAULIC DRILLING MECHANISM
Filed Nov. 15, 1945
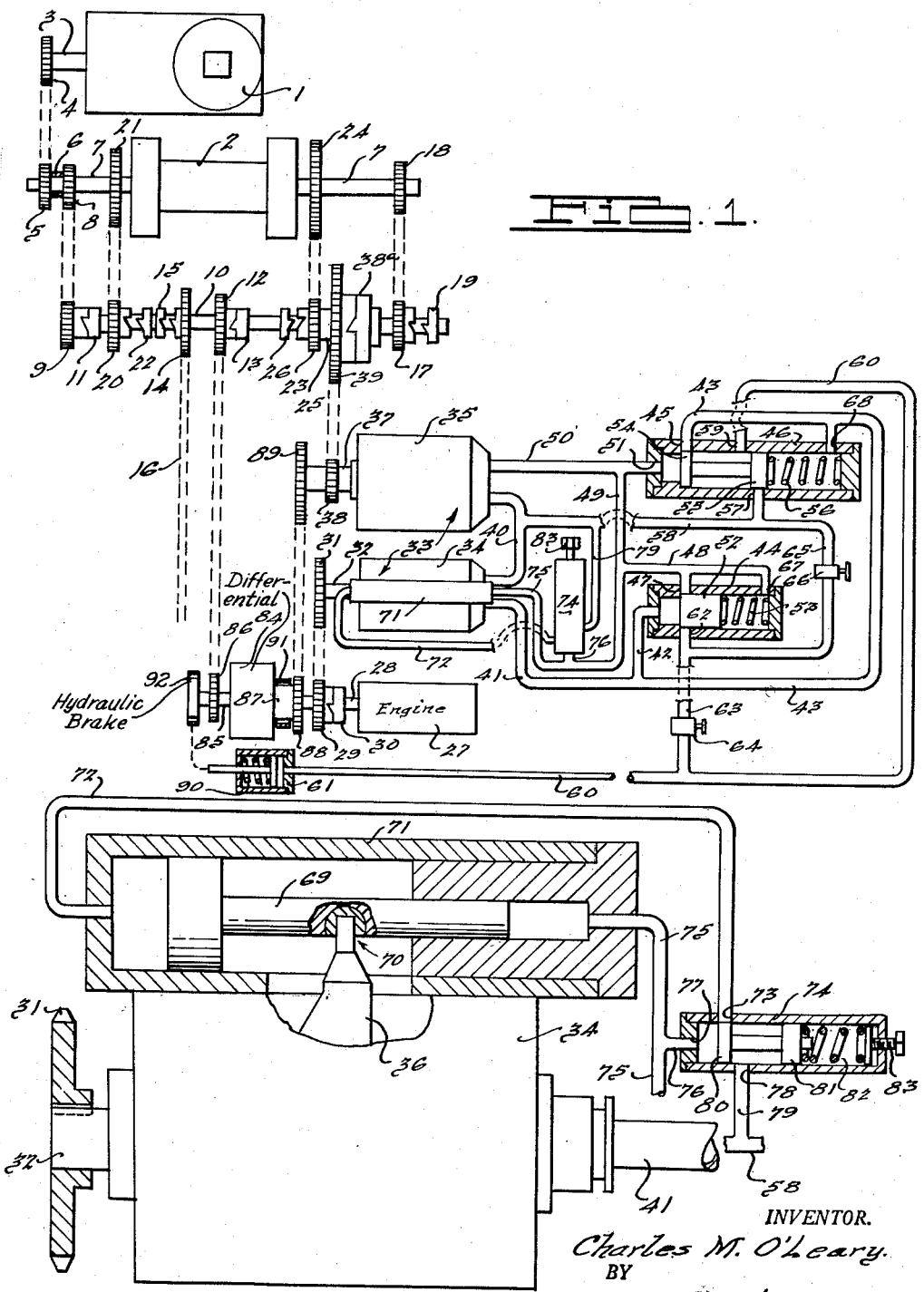
INVENTOR.
Charles M. O'Leary.
BY
Harness, Dickey & Pierce.
ATTORNEYS.

Patented Jan. 15, 1952

2,582,217

UNITED STATES PATENT OFFICE 2,582,217

HYDRAULIC DRILLING MECHANISM

Charles M. O'Leary, Los Angeles, Calif.

Application November 15, 1945, Serial No. 628,793

3 Claims. (Cl. 255—19)

The present invention relates to rotary well drilling apparatus and constitutes an improvement on applicant's co-pending application Serial #602,620, filed June 30, 1945, on Automatic Well Drilling Mechanism.

The foregoing application discloses an apparatus for controlling the weight of the drill bit on the formation in such a manner that the drill bit pressure varies in accordance with the torque required to rotate the drill stem, thus preventing the development of an excessive drill stem twisting force. The apparatus is effective to reduce the drill bit pressure to zero; or to elevate the drill stem if the torque applied to the stem becomes excessive, but does not stop rotation of the drill stem. In some rare instances, rotation of the drill stem will be blocked or encounter a severe resistance independent of the pressure of the drill bit on the bottom of the hole; and in such cases, relief of the drill bit pressure will not avoid a twist-off of the drill stem.

Accordingly, it is one object of the present invention to provide an apparatus capable of performing the functions of the apparatus disclosed in said prior application, and also of stopping rotation of the drill stem in the event that the drill stem rotating torque becomes excessive.

Another object of the invention is to provide an apparatus for varying the weight of the drill bit on the formation in accordance with fluctuation in the drill stem rotating torque which apparatus will require the expenditure of less power than that disclosed in said prior application.

Other objects and advantages of the present invention will become apparent from the following specification, the accompanying drawings and the appended claims.

In the drawings:

Figure 1 is a diagrammatical illustration of the apparatus of the present invention;

Figure 2 is an elevation view partly in section of the means for controlling one of the variable displacement pumps or motors employed in the apparatus.

Referring to Figure 1, there is illustrated at 1 a conventional rotary table of the type employed to rotate the drill stem of rotating drilling machine, and a hoisting drum 2 which, in accordance with conventional practice, carries a cable that is connected by sheaves to the drill stem for supporting and elevating same. The rotary table is driven in the usual manner by a shaft 3 and the shaft, in turn, is rotated by a sprocket 4 connected by means of a chain, indicated in dotted lines, to a sprocket 5 fixed to a sleeve 6 which is freely rotatable upon the shaft 7 of the hoisting drum 2. Sleeve 6 also carries a sprocket 8 connected by a chain to a sprocket 9 which is normally freely rotatable on a countershaft 10. Sprocket 9 may be clutched to shaft 10 by means of a sliding clutch member indicated diagrammatically at 11. In order to effect rotation of the table 1, shaft 10 is rotated by a sprocket 12 which is normally freely rotatable on the shaft 10 but may be clutched thereto by a sliding clutch member indicated diagrammatically at 13.

When it is desired to hoist the drill stem, clutches 11 and 13 are disengaged and shaft 10 is connected to a sprocket 14 which is normally freely rotatable on the shaft 10 but may be clutched thereto by a sliding clutch member 15. The sprocket 14, in turn, is rotated by means of a chain 16, from the usual hoisting engines, not shown. The rotating shaft 10 may then be connected to the shaft 7 of the hoisting drum 2 by any one of three pairs of sprocket and chain connections adapted to provide different speed ratios. The high speed ratio connection is affected by sprockets 17 and 18 and their connecting chain when sprocket 17, which is normally freely rotatable on shaft 10, is clutched thereto by a sliding clutch member 19. An intermediate speed ratio is provided by sprockets 20 and 21, the former being connectable to the shaft 10 by means of sliding clutch 22. The low speed ratio is provided by a pair of sprockets 23 and 24. Sprocket 23 is fixed to a sleeve 25, which is normally freely rotatable upon the shaft 10 but may be clutched thereto by means of a sliding clutch member 26. It will be understood that the sprockets 18, 21 and 24 are at all times fixed to the shaft 7, and that shaft 10 will be supported in any desired or conventional manner, not shown.

The apparatus of the present invention is intended for use during the actual drilling operation after the drill stem has been lowered into the hole. At that time, clutches 11, 13 and 26 will be engaged and clutches 15, 19, and 22 are disengaged. The shaft 10 is then rotated by rotation of the sprocket 12 in order to effect rotation of the drill stem, and the sleeve 25 is subject to a torque which will be effective through sprockets 23 and 24 on the hoisting drum to counter-balance a portion of the weight of the drill stem and thus control the pressure of the bit upon the bottom of the hole. This means includes a source of power which is connected to the sleeve 25 through a reversible, variable speed, positive displacement hydraulic transmission provided with means to maintain the torque transmitted therethrough at a constant value and a differential drive from a source of power to the sprocket 12, having the third member of the differential so connected to the drum 2 that the total torque transmitted to the drum remains consant as long as the drill stem rotating torque remains constant, but varies in accordance with variations in the torque required to rotate the drill stem but at a lower percentage magnitude of change than that of the drill stem rotating torque, in accordance with the principles outlined more fully in said prior application.

As shown diagrammatically in Figure 1, the preferred mechanism for performing the above functions includes an internal combustion engine 27, the output shaft 28 of which may be clutched to a sprocket 29 by means of sliding clutch member 30. The sprocket 29 is connected by a chain indicated by dotted lines to a sprocket 31 on the shaft 32 of a reversible, variable speed, positive displacement hydraulic transmission, indicated generally at 33. This transmission is made up of a pair of hydraulically connected positive displacement pumps 34 and 35, either one of which may operate as a pump while the other operates as a motor. Either one or both of the pumps 34 and 35 may be provided with means for varying its displacement, but in the preferred form the apparatus illustrated diagrammatically in the drawings, only the pump 34 is of the variable displacement type. While any desired type of positive variable displacement pump may be utilized, one satisfactory type is a pump of the wobble plate type. Both pumps 34 and 35 may be of the same type but only one need have means to adjust the angle of the wobble plate to vary its displacement.

Since the detailed construction of the hydraulic pumps 34 and 35 may be conventional and form no part of the present invention, it is not further illustrated or described herein. Further details of the construction are disclosed in United States Patent No. 2,171,177. It is sufficient to note merely that when the wobble plate of the pump 34, indicated diagrammatically at 36 in Figure 2, lies in a plane at right angles to the axes of the pump cylinders, the displacement of the pump is zero; and consequently, rotation of the shaft 32 by the sprocket 31 will not result in the flow of any fluid through the pump 34. When the angle of the wobble plate 36 is shifted in one direction from its zero displacement position, flow through the pump will occur in one direction, while a shift of the wobble plate in the opposite direction from the zero displacement position will result in flow through the pump in the opposite direction.

The two pumps 34 and 35 are so connected hydraulically that the shaft 37 of the pump 35 will rotate in one direction or the other depending upon the direction of flow of liquid through the pumps 34 and 35, and will remain stationary when no flow occurs through the pumps. Shaft 37 carries a sprocket 38 which is connected to a sprocket 39 that is freely rotatable upon the previously mentioned sleeve 25 but may be clutched thereto by a sliding clutch member 38a.

As a result of these connections, when clutch 38a is engaged and the drilling operation is in progress, the torque imposed upon the drum 2 by the weight of the drill stem will be transmitted through sprockets 24 and 23, sleeve 25 and sprockets 38 and 39 to the pump 35 thereby causing the pump 35 to develop a back pressure which is proportional to that portion of the weight of the drill stem which is imposed upon the drum 2. This pressure is transmitted to the pump 34; and means are provided for adjusting the angle of the wobble plate 36 in pump 34 to maintain the pressure developed by pump 35 at a substantially constant value regardless of the direction of rotation or the speed of rotation of the shaft 37. Therefore the hydraulic transmission always supports a fixed weight.

The hydraulic connections between pumps 34 and 35 include the low pressure line 40 which connects the intake ports of the pumps 34 and 35 and which may be connected to a low pressure liquid reservoir not shown, if desired. The discharge port of pump 34 is connected to a fluid line 41 which is divided into a pair of lines 42 and 43, which lead, respectively, to the inlet port of a check valve 44 and an outlet port 45 of a valve 46. The outlet port 47 of valve 44 is connected to the discharge port of pump 35 by conduits 48, 49 and 50. The inlet port 51 of valve 46 is also connected to the conduit 50. It should be noted that the intake port of either pump operates as a discharge port and the discharge port operates as an intake port when the pump acts as a motor.

Valve 44, which acts primarily as a check valve, contains a sliding valve plug 52, which is normally urged to the left as viewed in the drawing into the position illustrated and against a suitable stop by means of a relatively light spring 53, in which position it closes port 47. Valve 46 contains a valve spool provided with a pair of lands 54 and 55. The spool is normally urged by a relatively light spring 56 to the left as viewed in the drawing against a suitable stop and into a position in which it closes the port 45. In that position, the land 55 closes a port 57 which is connected to the low pressure line 40 by a conduit 58. Valve 46 is provided with a further port 59, which is always in communication with the space between the lands 54 and 55, and which is connected by means of a conduit 60 to a brake operating cylinder 61, hereinafter described in further detail. Valve 44 also has an additional port 62 which is connected by a conduit 63 to the conduit 60. Conduit 63 contains an adjustable restriction valve 64. Conduits 58 and 63 are also connected by means of a conduit 65, which contains a normally closed shut-off valve 66.

As a result of the above valves and connections, when fluid is flowing from pump 35 through line 50 and into pump 34 through line 41, as it will during unwinding rotation of the hoisting drum 2 incident to progress of the drilling operation, liquid will flow from conduit 50 into valve 46 and thereby shift the spool of that valve to the right, from the position illustrated, uncovering port 45. The liquid may then pass through port 45, lines 43 and 41 to the pump 34. At this time, since the pressure in line 50 will be slightly greater than the pressure in line 43 due to the slight pressure drop through valve 46, and since the pressure in line 43 acts against the left hand face of valve plug 52, while the pressure in line 50 acts against the right hand face of valve plug 52 through line 48 and port 67, valve 47 will remain in the position illustrated in which the valve plug closes port 62. However, line 63 will be connected to the low pressure line 40 through lines 65 and 58 and consequently, no pressure will be applied to the brake cylinder 61.

When the flow of liquid through the pump 34 is reversed, so that the flow is in the direction from pump 34 to pump 35, as will be the case when the drum 2 is rotating in a hoisting direction, the flow path of the liquid will be as follows: Liquid from conduit 41 will enter valve 44, thereby shifting the valve plug 52 to the right and uncovering ports 47 and 62. From port 47 fluid will flow through lines 48, 49 and 50 to the pump 35. At the same time, fluid under pressure will flow through port 62, line 63 and restriction valve 64 to line 60 and thus to the brake cylinder 61, the rate of such flow being dependent upon the degree of the opening of the valve 46. Under these circumstances, the pressure in line 41 will slightly exceed the pressure in line 50 by reason of the relatively small pressure drop through valve 44. As a result, the spool of valve 46 will remain in the position illustrated because the higher pressure in line 41 acts through line 43 and a port 68 on the right hand end of the valve spool in valve 46 while the lower pressure in line 50 acts on the left hand end of the valve spool. Since both ports 45 and 57 are closed, the pressure fluid discharged at port 62 of valve 44 cannot pass through valve 46 to the low pressure line 40.

It is apparent from the above, that the connections between the lines 41 and 50 are such as to permit flow in either direction from one line to the other but that when the flow is in the direction from line 41 to 50, fluid pressure will be applied to the brake cylinder 61, whereas, when it flows in the opposite direction, cylinder 61 is connected to the low pressure line 40. As hereinafter pointed out, the brake cylinder is effective to stop rotation of the drill stem when the drum 2 is rotating in a hoisting direction. The restriction valve 64 may be adjusted to delay the actuation of the brake cylinder in order to permit a limited hoisting rotation of the drum prior to the application of the brakes. The sole purpose of the valves 44, 46, 64, and 66 and their associated fluid lines, is to control the actuation of the brake cylinder 61. In the absence of the cylinder 61, these valves may be eliminated and line 41 connected directly to line 50.

The means for controlling the pressure developed in line 50 in order to maintain that pressure at a substantially constant value at all times is best shown in Figure 2. As there shown, the wobble plate 36 of the pump 34 is connected to a differential double-acting piston 69 by means of a ball and socket joint indicated generally at 70. The piston 69 is slidable in cylinder 71, the large end of which is connected by a conduit 72 to a port 73 in a pressure control valve 74. The small end of the cylinder is connected by conduits 75 and 49 to the line 50 as best shown in Figure 1. A branch 76 of line 75 is connected to a port 77 in the control valve 74. The pressure control valve is provided with a third port 78, which is connected to the low pressure line 40 by a line 79 and the previously mentioned line 58.

Valve 74 includes a spool having a pair of lands 80 and 81. A coil spring 82 normally urges the valve toward the left as viewed in Figure 2. Land 80 is adapted to control communication between conduit 72 and the conduits 76 and 79. Since the pressure existing in line 50 is also in communication with the left hand side of the valve spool, the spool will assume a position in which that pressure balances the force exerted by spring 82. When that position corresponds to that illustrated in Figure 2, port 73 is closed by land 80. Consequently, the right hand end of the cylinder 71 is in communication with the pressure in line 50 and the fluid in the left hand end of the cylinder 71 is trapped, thereby locking the wobble plate 36 in whatever position it assumes at the time that the spool of control valve 74 reaches the position illustrated in the drawings.

In the event that an additional torque is imposed upon the pump 35 by the hoisting drum 2, the pressure in line 50 will tend to increase thereby shifting the spool of valve 74 to the right against the action of spring 82 and permitting fluid to flow from line 75 through the valve and line 72 to the left hand end of cylinder 71 thereby shifting the wobble plate to a position in which it permits a greater flow of liquid through pump 34 in a direction from line 50 to line 41. As soon as this increased flow through the pump 34 (which is then acting as a motor) reduces the pressure in line 50 to its original value, the spool of valve 74 will return to the position illustrated and thereby hold the wobble plate 36 in its new position of adjustment. Accordingly, the valve 74 serves to maintain the pressure in conduit 50 and therefore, the torque exerted by pump 35 on the drum 2 at a constant value. This value may be adjusted by adjusting the tension of spring 82. For this purpose, a spring tension adjusting screw 83 is provided in the valve 74. It will be understood that the right hand end of the casing of valve 74 will be connected by a suitable drain line to the low pressure reservoir or line 40.

The speed of rotation of pump shaft 32 depends on the speed of the motor and will ordinarily be fairly constant. However, any changes in the speed of pump shaft 32 will be compensated for automatically by the mechanism which controls the angle of wobble plate 36. Therefore, the engine speed need not remain constant to maintain a constant pressure in line 50.

It should be noted that even though the pump 35 is operating as a motor to hoist or assist in hoisting the drill stem, during which operation fluid is flowing from pump 34 through lines 41 and 50 to pump 35, the pressure control valve 74 will serve to maintain the pressure in conduit 50 at the same constant value, therefore, maintain the torque imposed on the drum by the pump 35 at the constant value, the magnitude of which is determined by the adjustment of screw 83.

In order to drive the rotary table 1 and also to impose an additional drill stem supporting torque on the drum 2, which is proportional to the torque required to rotate the drill stem, the output shaft 28 of the engine is connected to a differential mechanism 84. One output shaft 85 of the differential carries a sprocket 86 which is connected by a chain to the previously mentioned sprocket 12 on shaft 10. The other output shaft, which is in the form of a tubular member 87 surrounding the shaft 28, carries a sprocket 88 which is connected by means of a chain to a sprocket 89 on the shaft 37 of pump 35. The differential mechanism 84 may be of any desired construction, one satisfactory form being that illustrated in applicant's previously mentioned co-pending application. It is sufficient only that it provide a driving connection between the engine and rotary table and transmit to the shaft 37 or the drum 2 a reaction torque proportional to the torque required to drive the table. It will be understood that the torque multiplication ratios between the engine and the rotary table 1 through the differential will be so selected as to provide a proper speed and torque for rotation of the table. The torque multiplication ratio between the engine and the drum 2 through the differential will be such that the maximum allowable increase above normal of the torque required to rotate the table will increase the torque exerted upon the drum 2 in a direction to elevate the drill stem by an amount approximately equal to that which would be imposed upon the drum by a weight equal to that normally exerted by the drill bit on the bottom of the hole.

The adjusting screw 83 for the hydraulic transmission control valve 74 is so set that when the table torque is at the maximum allowable value, the total torque transmitted to the drum 2 by the differential and the hydraulic transmission will just balance the entire weight of the drill stem. Consequently, when the table torque is normal, the pressure of the bit on the formation will remain constant at the desired value, but any increase in table torque will produce a corresponding reduction in the pressure of the bit on the formation. Since the allowable percentage increase in the torque required to rotate the drill stem is high compared with the percentage of the total weight of the drill stem which may be permitted to rest on the bottom of the hole during drilling, the percentage variation in drill stem supporting force will be much lower than that of the stem rotating torque.

During all normal drilling operations, the drum 2 is substantially stationary or is rotating very slowly in an unwinding direction. Accordingly, under those circumstances, the pump 35 is operating as a pump, and driving pump 34, which is then operating as a motor and transmitting energy to shaft 32. This power will assist in rotating the table.

In the event that the torque required by the table exceeds the maximum allowable value, the total torque transmitted to the drum will then be sufficient to elevate the drill stem and the drum will rotate in a winding direction to lift the bit off the bottom of the hole. Under those conditions, pump 34 operates as a pump, driving pump 35, which then acts as a motor. The design and adjustment of the mechanism is preferable such that such rotation of the drum 2 in a winding direction will not occur to any appreciable extent during normal drilling operations. When abnormal resistance to drill stem rotation develops, such as would be the case if a falling boulder jammed the drill bit or stem, lifting the bit off the bottom of the hole may not relieve the resistance to rotation. Accordingly, means are provided for stopping rotation of the rotary table when the drum begins to rotate in an winding direction or shortly thereafter. This means comprises a hydraulic brake indicated diagrammatically at 92 for holding the output shaft 85 of the differential stationary when the operating cylinder of the brake is supplied with liquid under pressure through the previously mentioned line 60. Brake 92 is normally held in a disengaged position by means of a spring 90. However, as previously pointed out, when motor 34 is operating as a pump and supplying liquid from pipe 41 to pipe 50, fluid under pressure will be admitted to the cylinder 61 and thereby apply the brake 92 and lock shaft 85 against rotation. The sprocket 88 and hydraulic transmission 33 will then continue to operate to elevate the drill stem. As soon as this condition arises, the operator may disconnect the apparatus of the present invention from the hoisting drum by applying the usual hand brakes, not shown for the drum, and disengaging clutch 38 or clutch 30 or both. The drill stem may then be manipulated under manual control in the conventional manner by means of a hoisting engine normally connected to the chain 16.

When it is desired to restore the mechanism to automatic operation, the pressure in cylinder 61 is relieved by manually opening valve 66. As soon as the brake is released, the valve 66 may again be closed and the automatic control reconnected to the drum and table.

In some cases, it may be desired to delay application of the brake 92 in order to permit a limited hoisting of the drill stem of the drum 2 without stopping rotation of the table. Accordingly, for that purpose, the adjustable restriction valve 64 is provided. That valve may be adjusted to delay the actuation of the brake to any desired extent.

The engine 27 may be employed to rotate the table during ordinary manually controlled drilling operations without employing the hydraulic transmission 33. This is accomplished by disconnecting the clutch 30 and locking the differential output shaft 87 against rotation by any suitable means. For example, the conventional drum brakes as normally used during drilling will be effective so long as clutch 38a is engaged and clutch 26 is disengaged. Or, if desired, a separate manually controlled brake may be employed on shaft 87, as indicated diagrammatically at 91. In the latter case, the engine will drive the rotary table without transmitting any torque to the drum. In either case, the pressure of the bit on the formation may be controlled in the usual manner by the hand brakes conventionally associated with oil well hoisting drums.

An important feature of the invention resides in the fact that during normal drilling operations, the hydraulic transmission and the differential supply the desired drill stem balancing torque without absorbing any energy from the engine. In fact, rotation of the drum is an unwinding direction incident to the drilling operation, tends to supply energy to rotate the table. The mechanism prevents twist-off of the drill stem not only incident to normal variations in resistance to rotation of the drill stem, which are compensated for by variations in the drill bit pressure, but by actually stopping rotation of the stem in the event that abnormal conditions develop.

It will be appreciated that any desired change speed and reverse transmission, not shown, will be provided in the driving connection between shaft 85 and rotary table 1, and that the torque multiplication provided between the sprocket 38 of pump 35 and the drum 2 must be sufficient to balance the desired proportions of the total weight of the drill stem. The amount of weight which is balanced may be adjusted over relatively large range by adjustment of the screw 83 of control valve 74. If desired, the adjustment so provided may be augmented by a change speed transmission between sprocket 39 and the drum or by employing, in lieu of the fixed displacement pump 35, a variable displacement pump similar to the pump 34 but subject to manual control in accordance with well known principles. Any suitable form of pressure control valve may be employed in lieu of the valve shown diagrammatically in the drawings.

It will be noted that in the above described apparatus, the application of the brake, which interrupts the delivery of the torque to the rotary table, is controlled by direction of the flow through pumps 34 and 35 and that the desired variations in drill bit pressure are achieved by augmenting the constant torque supplied to the hydraulic transmission by the delivery of the torque from the third member of the differential in the table drive.

While only one form of the invention is illustrated and described herein, it will be apparent that other variations in the design and construction may be indulged in without departing from the spirit of the invention or scope of the appended claims.

What is claimed is:

1. An automatic well drilling apparatus including a hoisting drum for supporting and elevating the drill stem, a rotatable power supply shaft, a reversible variable speed positive displacement hydraulic transmission connecting the shaft to the drum, means for maintaining the torque transmitted through said transmission at a substantially constant value independent of the speed or direction of rotation of the drum, means for rotating the drill stem, means independent of said transmission for applying an additional torque to the drum in a direction to support a portion of the weight of the drill stem and of a value proportional to the torque required to rotate the drill stem, said last means including a differential drive mechanism having a power input shaft and two power output shafts, one of said power output shafts being adapted for connection to the drill stem for rotating the same, and a drive connection between the other output shaft and the drum independent of said transmission.

2. An automatic well drilling apparatus, including a hoisting drum for supporting and elevating the drill stem, a rotary power supply shaft, a reversible variable speed positive displacement hydraulic transmission connecting said shaft to the drum, said transmission including a hydraulic pump unit connected to said shaft and a hydraulic motor unit connected to said drum, a common hydraulic flow circuit for said units, means for varying the displacement of said pump unit in either direction of flow from zero displacement for a given direction of operation of said shaft, control means responsive to the pressure in said flow circuit for so operating said first means as to maintain the pressure in flow circuit at a substantially constant value whereby the torque delivered to the drum by said motor unit is effective to support a fixed portion of the weight of the drill stem regardless of the direction and rate of rotation of the drum, means for rotating the drill stem, and means independent of the hydraulic transmission and responsive to the drill stem rotating torque for applying an additional torque to the drum in a direction to support another portion of the weight of the drill stem and of a value proportional to the torque required to rotate the drill stem, said last means including a differential drive mechanism having a power input shaft and two power output shafts, one of said power output shafts being adapted for connection to the drill stem for rotating the same, and a drive connection between the other output shaft and the drum independent of said transmission.

3. Well drilling apparatus, including a hoisting drum for supporting the drill stem, a rotary power supply shaft, a positive displacement hydraulic transmission connecting the shaft to the drum for transmitting to the drum a torque effective to support at least a portion of the weight of the drill stem, said transmission including a pump and a motor connected in a common hydraulic flow circuit, means for rotating the drill stem including a differential drive mechanism having a power input shaft and two power output shafts, one of said power output shafts being adapted for connection to the drill stem for rotating the same, a driving connection between the other output shaft and the drum independent of said transmission, means for maintaining the pressure in said flow circuit at a substantially constant value, a brake mechanism associated with the first-mentioned output shaft and effective when applied to hold the drill stem against rotation, and means responsive to a flow of liquid in said flow circuit in the direction which corresponds to rotation of the drum in a direction to elevate the drill stem for applying said brake.

CHARLES M. O'LEARY.

REFERENCES CITED

The following references are of record in the file of this patent:

UNITED STATES PATENTS

| Number | Name | Date |
|---|---|---|
| 1,703,234 | Halliburton | Feb. 26, 1929 |
| 1,788,015 | Crain | Jan. 6, 1931 |
| 1,832,634 | Hild | Nov. 17, 1931 |
| 1,836,998 | Thullen | Dec. 15, 1931 |
| 1,904,765 | Hawk | Apr. 18, 1933 |
| 1,962,346 | Hild | June 12, 1934 |
| 2,020,945 | Hild | Nov. 12, 1935 |
| 2,051,249 | Edwards | Aug. 18, 1936 |
| 2,109,782 | Rose et al. | Mar. 1, 1938 |
| 2,136,356 | Hild | Nov. 8, 1938 |
| 2,168,655 | Rose | Aug. 8, 1939 |
| 2,171,177 | Hodgman | Aug. 29, 1939 |